May 4, 1965 G. J. CANDREVA ET AL 3,181,253
LABORATORY TEACHING SYSTEM
Filed March 20, 1962 6 Sheets-Sheet 2

INVENTOR.
George Candreva &
Arthur Becofsky
BY
ATTORNEYS.

May 4, 1965 G. J. CANDREVA ET AL 3,181,253
LABORATORY TEACHING SYSTEM
Filed March 20, 1962 6 Sheets-Sheet 3

INVENTORS.
George Candreva &
Arthur Becofsky
BY
ATTORNEYS.

INVENTOR.
George Candreva &
Arthur Becofsky.

May 4, 1965

G. J. CANDREVA ET AL 3,181,253

LABORATORY TEACHING SYSTEM

Filed March 20, 1962

_FIG. 7_

INVENTORS
GEORGE J. CANDREVA
ARTHUR BECOFSKY
BY
OSTROLENK, FABER, GERB & SOFFEN
ATTORNEYS 3,181,253
LABORATORY TEACHING SYSTEM
George Candreva and Arthur Becofsky, both of
Box 13, Yorktown Heights, N.Y.
Filed Mar. 20, 1962, Ser. No. 181,014
8 Claims. (Cl. 35—60)

This invention relates to teaching systems, and more particularly to novel apparatus for teaching systems which incorporates coordinated sight, sound and response elements resulting in a much improved teaching function.

Teaching systems presently in use employ either teaching means of the Skinner type or visual aids or audio aids. There has been various experiments, such as the experiments of Professor Porter of Harvard and Paul Weimer of RCA, which experiments have led these authors to the conclusion that teaching machines which individually employ the aids previously recited have distinct limitations as to their usefulness. The results of these findings have been published in A. A. Lumsdaine Teaching Machines and Programmed Learning.

The teaching system of the instant invention incorporates the elements of the teaching machine for the response function, the visual aids and the audio aids into one integrated unit in order to optimize the teaching machine approach to obtain the maximum results through the use of such mechanical teaching aids.

The instant invention is comprised of a console having a telescoping table arrangement which is adapted to expand from the dimensions of the console into a large table which provides a large working area for the students who will be using the teaching system facilities. The working surface member is placed upon the telescoping structure in order to accommodate the teaching systems to be placed upon the working surface.

Each individual teaching unit placed upon the working surface consists of a housing which contains a viewing surface, a record-play back device and a teaching or response unit. The visual aid consists of a film strip projection means and associated viewing surface of sufficient size so as to be viewed by the single user of the response unit. This means brings to the student a visualization of the subject matter to be taught and lends support to and is supported by the other teaching aids.

The viewing surface as another embodiment may consist of two alternative optical systems:

(1) 35 mm. filmstrip viewing surface
(2) Combination 35 mm. and 8 mm. motion picture viewing surface, thus, permitting the use of either stills or movies during the teaching format.

A record-play back means is also provided in the unit which is comprised of head phones for the individual user, and which plays back material recorded therein, and which is integrated with the visual aid so as to provide an advantageous cooperative relationship therebetween. A master record-play back device is provided in the console, which is to be adapted as to play back into the individual head phones of each response unit the material recorded in the master machine. In addition the connections provided therein are adapted so as to enable the instructor to speak into the master recorder and have his dissertation transferred through each individual head phone set to the student using the associated response unit. This enables the instructor to interperse additional information into the teaching program so as to review important material, difficult reading material and to stress spelling phonics and ask questions as the program unfolds.

The teaching machine provided in the individual response unit is comprised of a question area, a correct answer area and answering area, which is so adapted as to permit the student to respond to the question presented in the interrogation area by writing his response in the response area and subsequent thereto by comparing his written answer with the answer provided in the answer area of the teaching device. This phase is designed to encourage participation of the pupil at the motor level, and insures physical activity, this being the basic ingredient in the pupil's interest and development.

A master projection means is also provided for display of instructive material to the entire group when desired, as an alternative to projection by each of the individual projectors of the associated response units.

The console is arranged to accommodate the components of the working surface which may be stored within the console when the Stack-A-Lab System is not in use. The working surface is broken up into a plurality of elemental units which mechanically and electrically engage one another when the working surface structure of the console is extended for receipt of the working surface. Each working surface unit is capable of accommodating a plurality of response units on opposite sides thereof. A centrally loacted power means is provided on each working surface elemental unit, the power means being engageable with the console for making connection with the main power source and having a plurality of outlets along its length for connection with the response units to be positioned thereon. The opposite ends of each working area are connectible to adjacent working area elemental units in order to provide each ensuing working area with the electrical power needed to energize the response units. Since the working surface is broken up into a plurality of elemental units and since the working surface supporting structure is extendible to a plurality of positions between the fully closed and fully opened positions, the number of response units which may be placed in use at any one time is flexible, depending only upon the needs of the user.

The response units are provided with a primary drive means, which is employed for controlling the positioning of the documents associated with the question work and response area of the teaching unit, so that the feeding of the written material contained therein is under the control of a single push-button. A direction controlling device is provided for permitting movement of the material contained therein in either the forward or reverse directions. However, alarm means are provided in each response unit which are adapted to be energized when the controlling device is placed in the reverse direction, in order to apprise the instructor that the student using the response unit is reversing the feed of the teaching unit contained therein. The alarm provides an advance indication to the instructor prior to the time that the student has the opportunity to alter his answer in any way.

Tally means are provided in the response unit for the purpose of keeping a cumulative count of a number of successful completions which have been performed by the response unit user per frame advanced in the response portion of the response unit.

The three elements, namely the visual, audio and teaching unit elements, combine in a unitary member to provide the "normal environment of learning" which is advantageous in that it causes the student to employ all of his senses in order to derive the instruction presented through the teaching system. The material presented by each individual unit is so programmed as to cooperate with the other aids to provide a well-integrated instructional format which intersperses the operation of each aid with the operations of the remaining aids in such a manner as to generate a key interest in the instructional material being presented.

It is therefore one object of this invention to provide a teaching system which is comprised of a novel console arrangement sufficiently flexible to accommodate a large or small number of teaching units, dependent only upon the needs of the user.

Another object of this invention is to provide a novel console unit for a teaching system which has a telescoping working surface supporting structure arranged to accommodate working surfaces of varying lengths.

Another object of this invention is to provide a novel console assembly for teaching systems having a working surface which is comprised of a plurality of working surface elemental units which are adapted to mechanically and electrically engage one another to simultaneously provide the working surface for response units and to provide the electrical power needed to energize each response unit.

Still another object of this invention is to provide a noval assembly for a teaching system which comprised of a response unit having visual, audio and response means contained therein for presenting an integrated instructional teaching format.

Another object of this invention is to provide a novel response unit for use in instructional programs which comprises visual, audio and response means, and wherein the response means is provided with control means for feeding the material contained therein, and having alarm means energizable to signal the improper usage of the response unit control means.

Another object of this invention is to provide a novel teaching system comprised of a response unit, having visual, audio and response means, wherein the response means is provided with tally means for keeping a cumulative count of the number of frames successfully completed by the user of the response unit.

These and other objects will become apparent when reading following description and drawings in which:

FIGURE 6a is a perspective view.

Referring now to the drawings and especially FIGURES 1 and 2a through 2c, the console assembly 10 is comprised of a housing portion 11 with pivotally mounted doors 12 and 13 at one end thereof. The hinged doors 12 and 13 provide access to a storage compartment 14, having a plurality of drawers 15 along one side thereof. A plurality of upper guide means 16 and lower guide means 17 are provided along the upper and lower surfaces of the compartment 14. Each of the guide means 16 are positioned parallel to one another and to the guide means 17. The upper and lower guide means are positioned relative to one another so as to form guide bars, such as, for example, the guide bars 16', 17', which are adapted to removably position and secure the work surface elemental units 18 which are housed therein when the console assembly is in the closed position. An additional drawer 19 is provided immediately above the compartment 14 for the purpose of storing additional material required during the usage of the teaching console assembly. Casters 20 are provided beneath the housing 11 and at each of the corners thereof for the purpose of rendering the console mobile. A flat level upper surface 21 of housing 11 is provided for the purpose of either displaying instructional material or for positioning the material used during the teaching format, such, as for example, the slide projector 22 and the tape recorder master 23 units which are positioned on surface 21.

Console assembly 10 further includes a telescoping structure 24 which is comprised of legs 25 and 26 secured to a cross bar member 27. Legs 25 and 26 are provided with casters 27 in order to make the entire console 27 mobile in the fully extended position as well as in the collapsed position. Front and rear telescoping members 28 and 29 respectively are mechanically linked to the cross bare member 27 and are arranged to be slidably engaged with suitable openings (not shown) in housing 11, to provide a compact console arrangement in the fully collapsed position. The telescoping members 28 and 29 are arranged so as to permit legs 25 and 26 to be moved in the direction shown by arrow 30 in FIGURE 2a, so as to provide a supporting structure for any number of the working surface elemental units 18, in a manner to be more fully described.

The working surface units, such as, for example, the unit 18', are placed into use by being positioned on top of the telescoping members 28 and 29. The dimensions of the working surface unit 18' are such as to provide adequate space for at least two response units on each side of the working surface unit 18'. Only one response unit is shown on each half of the working surface 18' in FIGURE 1, namely the response units 40 and 40', but it should be understood that a total of four such units may be placed on working surface unit 18'.

A conduit 31 is centrally located on working surface unit 18'. Each conduit 31 is comprised of a male plug configuration at its left-hand edge (not shown in FIGURE 1), which is adapted ot engage a female plug 32 provided on the side wall 33 of housing 11 (see FIGURE 2b). The opposite end 34 of conduit 31 is provided with a female plug configuration which is adapted to be engaged by the left-hand end of the next working surface unit, which is positioned adjacent working surface unit 18'. Thus, it can be seen that the conduit 31 provided on each working surface unit is interchangeable with any other working surface unit, and any number of units may be connected together depending solely upon the limits to which the telescoping members 28 and 29 may be extended. Each conduit is further provided with a plurality of phono-plugs such as the phono-plugs 32 and 33, which plugs are electrically connected to the output circuit (not shown) of the recorder master unit 23, so that upon play back of recorded material through the tape recorder master unit 23 or upon use of the microphone of the tape recorder master unit 23 by the instructor, all such audio material is available to the students seated adjacent the working surface unit 18' assembly by inserting the head phone set jack (not shown) into one of the phono-plugs 32 or 33. It should be understood that the number of phono-plugs provided on conduit 31 is equal in number to the number of teaching units 40 which may be accommodated by the working surface unit 13'.

Figure 1:
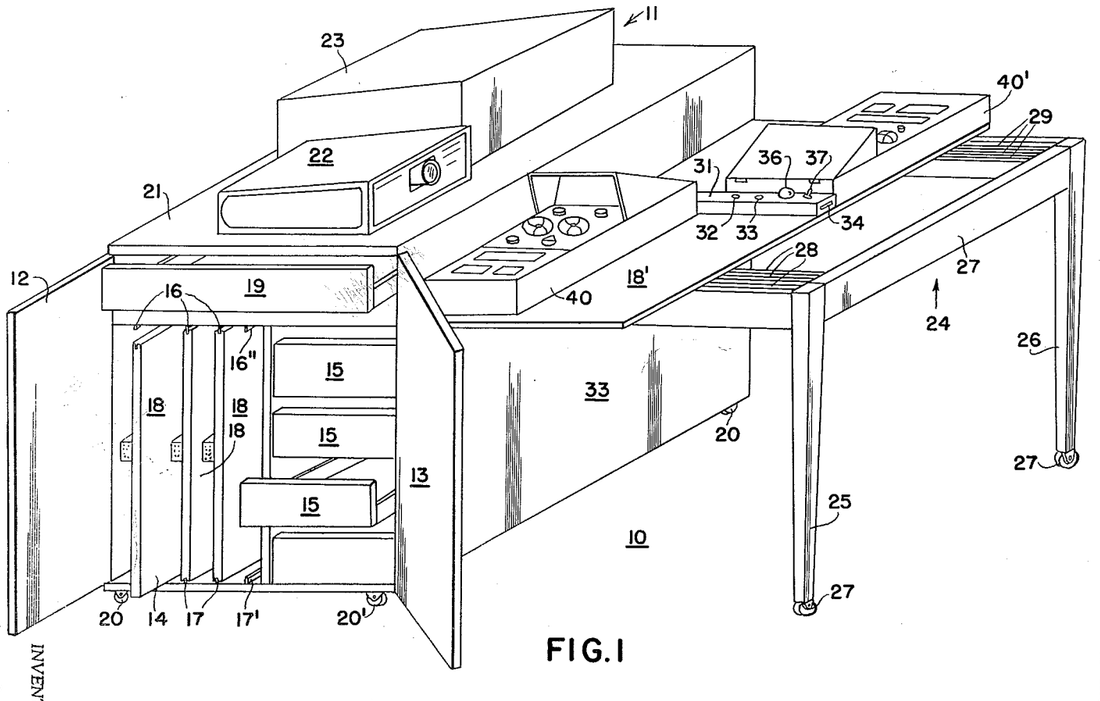
FIGURE 1 is a perspective view of the console assembly with the individual teaching units positioned thereon.
Figure 2A:
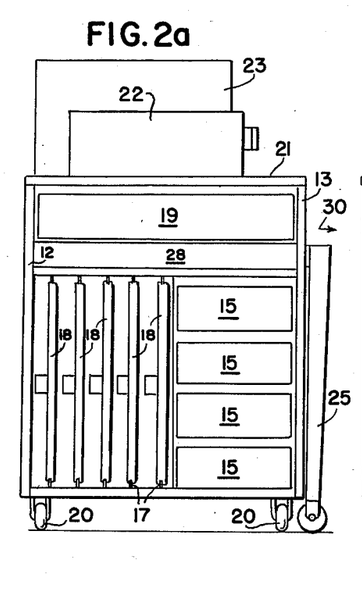
FIGURES 2a, 2b and 2c are side, front and top views respectively of the console unit of FIGURE 1 in the collapsed or closed position.
Figure 2B:
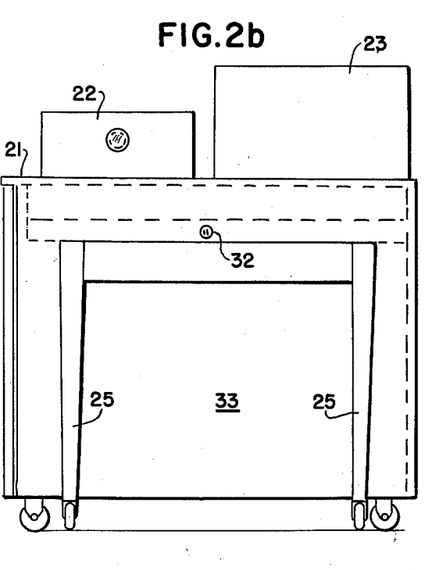
Figure 2C:
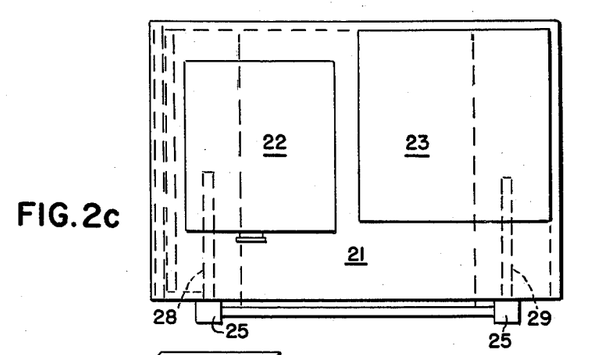

If it is so desired, the working surface units such as the unit 18' may be arranged so as to accommodate only the teaching units arranged in the diagonal phase as shown in FIGURE 1, leaving the remaining portions of the surface area as further work areas to be utilized by the student.

Conduit 31 is further provided with an assistance arrangement which consists of a colored lamp 36 and a lamp operating switch 37, which when assistance is required by the student is actuated in order to energize its associated lamp 36. It should be understood that an assistance lamp and control switch bar 36 and 37 are associated with each teaching unit 40, thereby providing each student using teaching unit 40 with an assistance lamp, which is used to apprise the instructor of the fact that that particular student requires aid of some sort.

Figure 6:
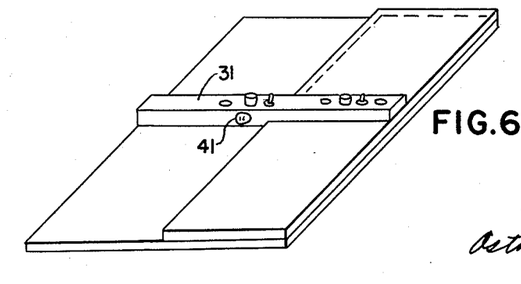
FIGURE 6 is a perspective view of one of the working surface units employed with the console unit of FIGURE 1.
Figure 6A:
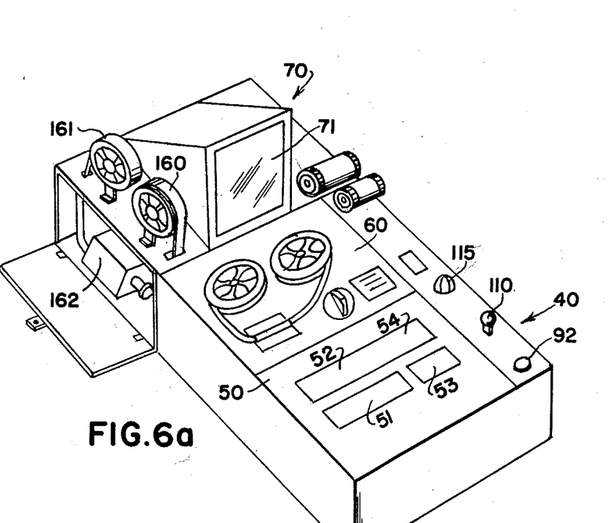
Figure 6B:
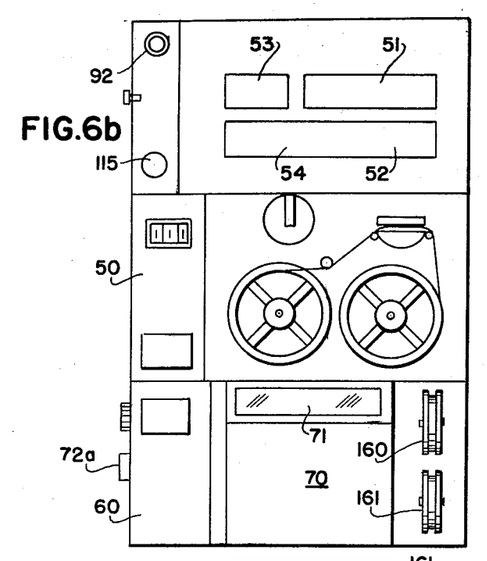
FIGURES 6b, 6c and 6d are top, end and side views respectively of another preferred embodiment of the teaching unit shown in FIGURE 3.
Figure 6C:
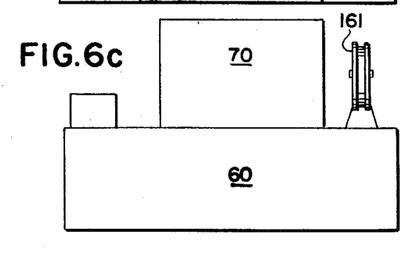
Figure 6D:
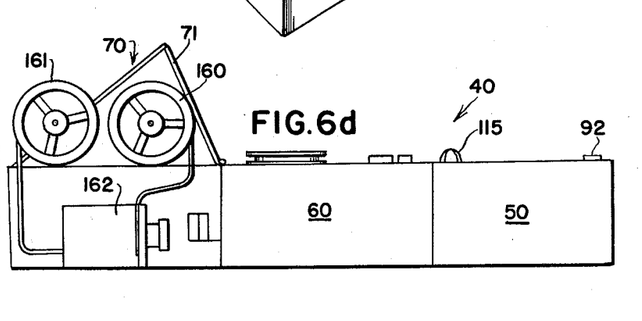

The conduit 31 further includes an electrical outlet, such as is shown in FIGURE 6 of the drawings, which engages a male plug (not shown) positioned along the rear wall of the teaching unit 40. Thus, when the teaching unit 40 is properly positioned on the working surface unit 18', the electrical energy required for operation of the units contained therein is provided through means (not shown) 41 in the console to conduit 31 and then through electrical outlet 41.

Figures 3, 4B:
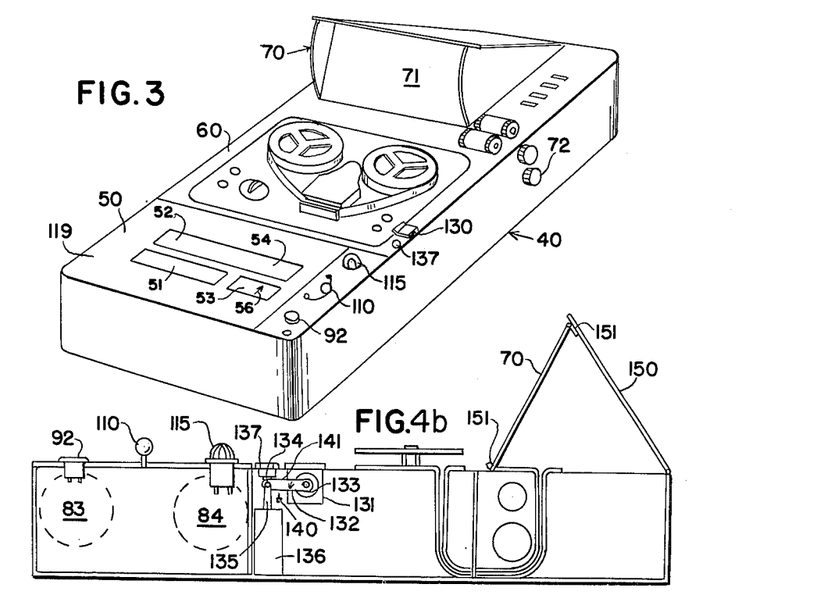
FIGURE 3 is a perspective view of one of the teaching units employed with the console unit of FIGURE 1, showing the teaching unit in greater detail.
FIGURES 4a and 4b are top and side plan views respectively of the teaching unit of FIGURE 3.

FIGURE 3 shows a typical teaching unit 40" which consists of a teaching machine 50, a portable type tape recorder 60, and a film projector and viewing screen assembly 70. The screen portion 71 is positioned so that a student sitting in front of the teaching unit may readily view images projected onto the screen surface 71. The projector employed therein is of the type adapted to accommodate both 35 millimeter slides and strip film which may be advanced in a one-at-a-time fashion by the manual control knobs 72 provided at the side of the teaching machine 40". The projector provides the student with a visualization of the subject matter to be taught, and the material portrayed on the screen is supported by appropriate captions for better understanding of the instructional material.

Referring now to FIGURES 6a–6d, another preferred embodiment of the teaching unit showing alternative projection means is comprised of an 8 mm. projection system 162 having take-up and supply reels 160 and 161 respectively mounted to the top face of the teaching unit 40 in a position to the left of the viewing surface 71. Conventional 8 mm. optics are used to deliver an image to the viewing surface 71 by means of an assembly (not shown) of reflecting mirrors which deliver the image to the screen 71. The reels 160 and 161 are activated at the appropriate running speed by a motor (not shown), similar in nature to the motor described for use in the roller system of the Skinner-machine portion of the teaching unit 40, which is to be more fully described. A rheostat controlled circuit (not shown) operated by knob 72a controls the speed at which the 8 mm. film moves, thereby enabling slow framing and still framing to be employed at any time during the instructional format. This 8 mm. projection optic, as is the case with the still projection facility, likewise functions vis-a-vis the tape recorder and Skinner-machine facility in the same syndrome as the 35 mm. filmstrip. The purpose of this optic is to make available to the user an additional depth dimension to the study experience.

The tape recorder unit 50 supplies the audio portion of the instructional program and is used in cooperation with a head phone set worn by the student, enabling the student to listen to the material recorded therein without disturbing other students seated in the immediate area. If the material which the student is to hear is recorded only in the master table unit, the head phone set is plugged into the head phone plug 32, provided on the working unit conduit 31. This enables the use of a master tape either for the instructional program or for the use of individual tape units in each teaching unit, such as the teaching unit 40" of FIGURE 3.

In conjunction with the visual material the recording unit brings to the pupil the voice of the master-teacher, which takes the pupils through the subject matter portrayed by the film strip in a step-by-step arrangement, it being understood that the tape recorder material is appropriate to be programmed with respect to the sequence of the visual material to be portrayed by the projector unit 70. In this manner the master recorder 23 or the individual recording unit 50 provide the pupil with: (1) supporting data; (2) a correct reading and pronunciation of the captions of each slide projected; (3) assistance with reading difficulties by anticipating such difficulties; (4) further explanation of key concepts contained in each frame projected on the viewing screen; (5) personalized comments and anecdotes relating to the subject; (6) oral drills on phonics and spelling and (7) leading questions which are designed to encourage a genuine inquiry and a genuine response from each participating pupil at the mental level.

The teaching machine portion 50 is comprised of an interviewing opening 51, a question opening 52 and a writing opening 53, the functions of which are performed in the following manner:

The question which is asked of the individual student appears on a document which is positioned so as to be read through window 52. The student then in response to the question writes his answer on a document which is positioned so as to be immediately beneath window 53. Then upon operating the response unit, control means advances the document (not shown) so that the correct answer positions itself immediately beneath window 51, so that it may be compared against the answer supplied by the student which moves to the right-hand portion 54 of window 52 enabling a direct comparison of the student's answer against the answer supplied by the teaching machine. Openings 52 and 51 are provided with transparent cover members, such as glass, on a transparent plastic substance which permits the material beneath the transparent member to be read easily while at the same time preventing any physical contact with the material. Thus, with the document positioned under window 53 moving in the direction of opening 52 as shown by arrow 56, the transparent member covering opening 52 prevents any access thereto in order to prevent any change of the answer which is supplied by the student using the teaching unit 50.

Figure 4A:
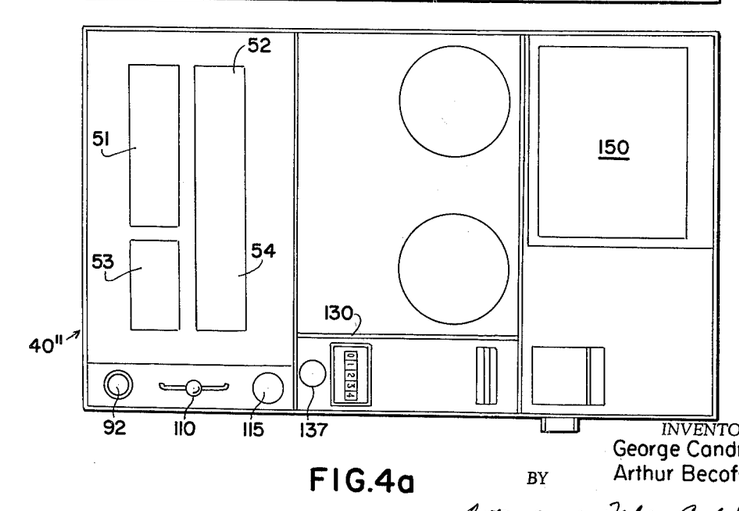
Figure 5A:
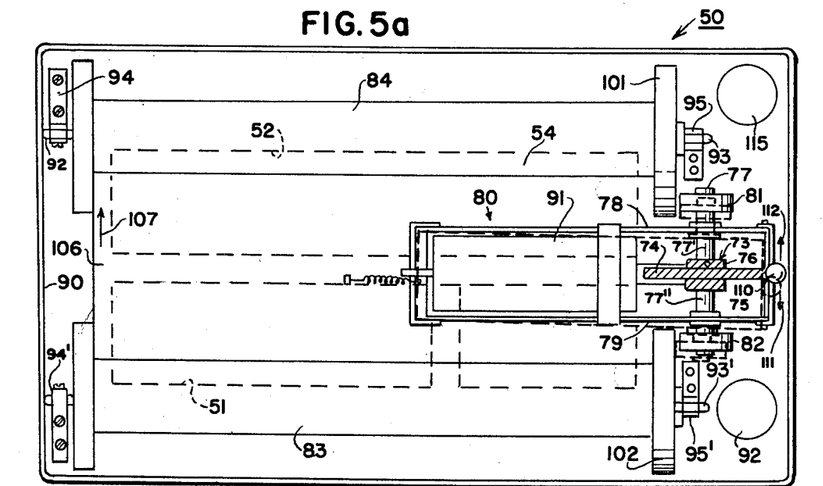
FIGURES 5a, 5b and 5c are top, front and side plan views of the response portion of the teaching unit of FIGURE 3, in which the cover has been removed in order to show the internal components.
Figure 5B:
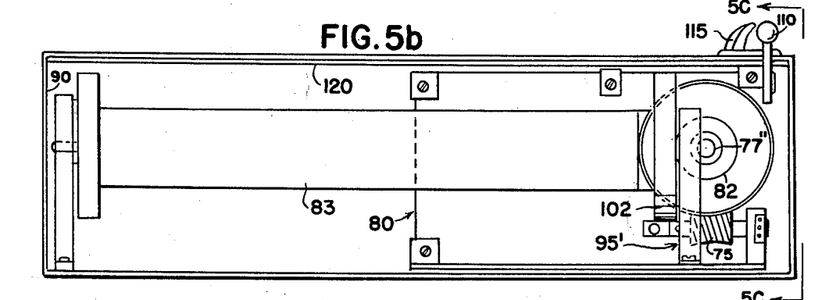
Figure 5C:
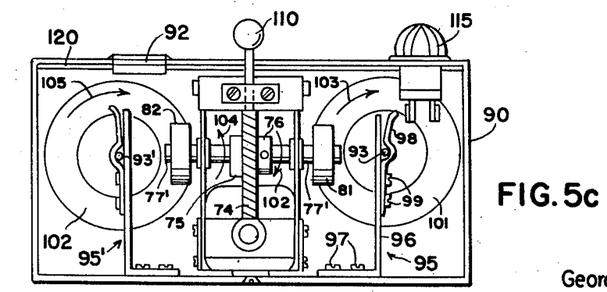
Figure 7:
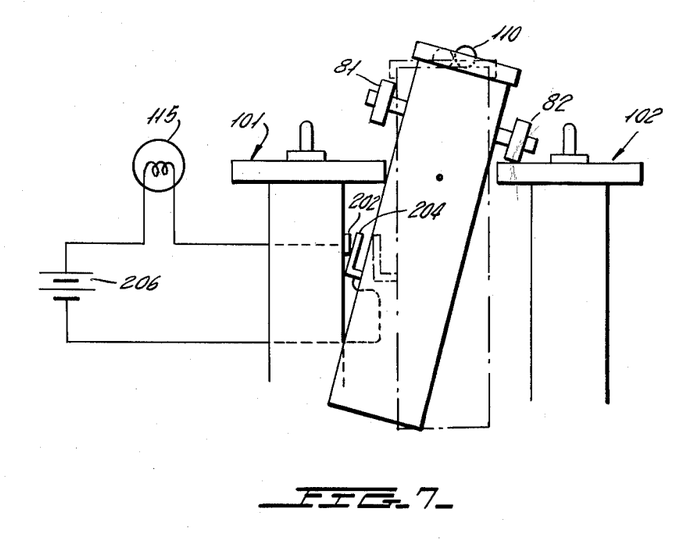
FIG. 7 is a simplified representation of the arrangement for reversing the direction of moving the educational material with the accompanying energization of the thwart means.

The control means for the teaching or response unit 50 is shown in FIGURES 4a, 4b and 5a through 5c and consists of a motor 91 which is energized by push-button member 92 which is provided on the upper surface of the teaching unit 40". The motor 91 is mechanically linked to a worm gear speed reducer mechanism 73, consisting of a worm gear member 74 and associated engageable gear members 75 and 76. Gears 75 and 76 are secured to a shaft 77 which is pivotally mounted by means of apertures (not shown) in the side walls 78 and 79 of the housing 80 containing the motor and worm gear reducing assembly. A pair of circular discs 81 and 82 are secured to opposite ends of shaft 77 and are rotatable therewith upon rotation of shaft 77. Housing 80 is pivotable by control member 110 about its pivot point 200 (as best seen in FIG. 7). This serves to provide either driving engagement of circular disk 81 with spool member 101 or circular disk 82 with spool member 102. The engagement of members 81 and 101 corresponds to driving the document 106 in a forward direction, with the engagement of members 82 and 102 (as shown in FIG. 7 and in the dotted position of FIG. 5a), serving to drive the document 106 in the reverse direction. A pair of elongated rollers or spools 83 and 84 are mounted within the housing 90 of the teaching unit 50. Each spool member, such as for example the spool member 84, is provided with projections 92 and 93 at opposite ends, which are adapted to be engaged by associated brackets 94 and 95 respectively. Referring to FIGURE 5c the bracket 95 consists of an L-shaped member 96 which is secured to the base of housing 90 by fastening member 97. A second bracket member 98 is secured to the upper end of L-shaped bracket member 96 by fastening means 99. The second bracket member 98 is formed so as to define a semi-circular configuration in cooperation with L-shaped bracket 96 in which the projection 93 of spool 84 is inserted so as to be rotatably mounted therein. It should be understood that bracket 94, which pivotally mounts projection 92 at the opposite end of spool 84 is identical in design to the bracket assembly 95 shown in FIGURE 5c, and likewise brackets 94' and 95' employed for the pivotal mounting of spool 83 are of similar design.

The rubber rollers 81 and 82 are positioned so as to frictionally engage the spool ends 101 and 102 of spools 84 and 83 respectively when shaft 72 is urged into rotation. The shaft 77 is actually a split shaft having a first half 77' associated with gear 76 and roller 81 and a second half 77" associated with gear 75 and rubber roller 82. The operation of the spool control assembly is as follows:

Upon depressing push-button 92 motor 91 is energized rotating worm gear 74. Worm gear 74 engages gears 75 and 76. The teeth of gear 75 are in the reverse arrangement to the teeth of gear 76, so that with rotation of shaft 77" counter-clockwise shaft 77' rotates in the clockwise direction. Thus, it can be seen in FIGURE 5c with shaft 77' rotating in the clockwise direction as shown by arrow 102, rubber roller 81 causes spool 84 to rotate clockwise about its pivot point 93 as shown by arrow 103.

Simultaneously therewith shaft 77" rotates counter-clockwise as shown by arrow 104, causing rubber roller 82 to drive spool 83 clockwise about its pivot point 93' as shown by arrow 105. Thus, with the positioning of a paper document such as the paper document 106 and with rotation of the spools 83 and 84 as shown in FIGURE 5c of the drawings, document 106 is moved in the direction shown by arrow 107 of FIGURE 5a.

The question asked of the student therefore appears beneath the opening 52 shown in dotted fashion in FIGURE 5a, while the answer to that question has not yet appeared beneath opening 51. When the answer provided by the student is written on the document as it appears beneath the opening 53, the document 106 may then be advanced in the direction shown by arrow 107 by depressing button 92. This causes the answer written by the student to move to the right-hand portion 54 of opening 52, and at the same time causes the correct answer provided by the teaching machine 50 to be positioned beneath the opening 51. This places both the correct answer and the answer supplied by the student beneath a transparent member and out of reach of the student in order to prevent any change of the answer which has been written upon the document.

A control member 110 is provided at the right-hand end of teaching unit 50, which is employed for the purpose of reversing the feed direction of a paper document 106, which is positioned between rollers 83 and 84. By moving the control member downward in the direction shown by arrow 111 the document 106 is fed in the direction shown by 107, which is the normal feed direction. When moving the control knob 110 in the direction shown by the arrow 112, motor housing 80 is pivoted to cause driving engagement of disc 82 and spool member 102. This causes the document 106 to be fed in a direction opposite to that shown by arrow 107. Since this would permit a written answer to return to a position beneath the opened window 53, a thwart lamp 115 is provided which is electrically connected in such a manner as by contact 202 carried on carriage 80, which completes the circuit of thwart lamp 115 to battery source 206. Thus, lamp 115 becomes energized when control handle 110 is positioned so as to reverse the feeding of paper document 106 from the normal direction shown by arrow 107. The energization of lamp 115 thereby apprises the instructor of the reverse feed of the paper document, so as to draw his attention to the pupil who is using the teaching unit 50 in this manner, in order to prevent any alteration of the last written answer provided by that student.

Since a portion of the paper document 106 is to be used for writing, a resiliently suspended plate 120 is provided beneath the surface 119 of the teaching machine 50. The plate 120, which can best be seen in FIGURES 5b and 5c of the drawings, has a configuration which is adapted to permit the paper document to be threaded between the resiliently suspended plate 120 and the surface 119 of teaching machine 50. This enables the student using the teaching machine to write upon the document as it appears beneath opening 53, thereby providing the student a supporting surface for the paper document.

In order to keep a cumulative count of each student's progress, a tally counter assembly 130 is provided along the right-hand end of each teaching unit 40', as is most clearly shown in FIGURES 4a and 4b. A metallic counter is comprised of an advanced by one type counter device 131, the count of which is advanced by rotation of the extended arm 132, which is secured to a rotatable shaft 133, extending from one end of the counter device 131. Arm 132 has its opposite end 134 pivotally connected to the armature 135 of a solenoid member 136. A control button 137 is mounted so that access may be had thereto at the surface of the teaching machine, and is electrically connected between an energy source (not shown) and solenoid member 136, so that upon depression thereof solenoid 136 becomes energized, causing armature 134 to move downward in the direction shown by arrow 140. This movement causes arm 132 to be rotated counter-clockwise as shown by arrow 141 a sufficient amount to advance the count of the counter device 131 by the count of "1." The operation of the tally counter is such that upon comparison of the answer supplied by the student with the answer supplied by the teaching unit 50, a coincidence of the answers is registered in tally counter assembly 130 by depression of the control button 137.

The operation of the complete teaching unit assembly with respect to an instructional program is as follows:

Assuming that the topic of study is "Life in Ancient Egypt," which may for example be of a grade level for superior fourth, strong fifth or average sixth grade students, the following sequence is provided:

As a first step the pupil (or pupils) is (are) taken through the first half of a film strip contained in the viewing device 70. The objective of this step is to give the student a thorough familiarity with the captions, the content of the viewing material, and also aids in the spelling of the key words contained therein. The scenes projected onto the viewing screen act to support the student's understanding of the frame of reference in which both words and concepts function.

As a further example:

Visual unit

The visual unit, upon initiation of the instructional format, displays a title frame showing a typical Egyptian scene with a prominent title reading "Life in Ancient Egypt."

Audio unit

Simultaneously with the projection of the title frame, the tape recorder provides the following message.

The title of this film strip is "Life in Ancient Egypt." We are about to look back into some of the oldest pages in man's history. Our study will take us back to 3,000 years before Christ, and that is very old, indeed. What word do we see in the title that means the same as old? Turn your dial on the teaching machine and see if you can answer my question.

Teaching machine unit

Upon depression of the motor energizing button 92 of the teaching unit, the following question appears beneath the opening 52.

The title of this film strip is "Life in Ancient Egypt." What is the word in this title that means the same as old in time?

Upon completion of the thinking process of the student in order to respond to the above question, the student then places his answer on the document positioned beneath opening 53. Upon completion of the act of writing the answer, the motor energizing button 92 is depressed in order to move the answer provided by the teaching machine beneath the opening 51. When this occurs the answer provided by the student moves beneath the right-hand portion 54 of opening 52, enabling a direct comparison between the student's answer and the teaching machine's answer, in order to permit the student to determine his progress throughout the entire format.

With the integrated use of the visual, audio and teaching machine material into the individual response unit such as the unit 40″ shown in FIGURE 3, the cooperative relationships therebetween establish the "normal environment of learning." Since all three of these elements are elements to which the student has been habituated, and are the primary stimuli that encompass the student's mental experience, to proceed with any auto-instructional technology without such an integrated system would act to detract from the "normal environment of learning."

The instructional format as previously described may be under the control of either the tape recorder master unit and projector master units 23 and 22 respectively, which cooperate with the individual response teaching units 50 of each response unit 40, or the individual viewing unit 70 and tape recorder 60 of each response unit 40 may be employed to provide the teaching format. The individual tape recorder unit 60 and viewing assembly 70 of each teaching unit may be employed also to enable the student to either pursue or review the instructional format at home simply by carrying the response unit 40 from the school to the home, thereby giving the unit versatility for both home and classroom instruction. The viewing screen 70 is pivotally secured to a cover member 150 at pivot point 151, and is removably linked to response unit 40″ at 152, permitting viewing screen 70 to be folded beneath cover member 150 so as to enclose the projection portion of the response unit 40″, in the manner shown in FIGURE 4a.

It can therefore be seen that we have provided a console assembly for a teaching system, which is collapsible to an extremely compact unit and extendable to accommodate a large number of students, and which is provided with individual response units which take advantage of visual, audio and teaching machine aids in order to provide a most advantageous teaching program.

Although we have described preferred embodiments of our novel invention, many variations and modifications will now be obvious to those skilled in the art, and we prefer therefore to be limited not by the specific disclosure herein but only by the appended claims.

The embodiments of the invention in which an exclusive privilege or property is claimed are defined as follows.

1. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure, as determined by its selectable predetermined positioning, defining the number of elemental units to be accommodated; common conduit means positioned along said working surface elemental units, an individual section of said common conduit means integral with each elemental unit, each common conduit section having a first end and a second end, said first end adapted to engage the second end of a preceding section, with the first end of the common conduit section closest to said main housing engaging a cooperating outlet along the wall of said main housing, at least one teaching unit having coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console.

2. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units, at least one teaching unit having coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; phono plug means positioned upon each of said conduit means sections; master recorder means at said main housing, said phono plug means being adapted to connect said master recorder to a local headphone set at each teaching unit location.

3. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units, at least one teaching unit having coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; phono plug means positioned upon each of said conduit means sections; master recorder means at said main housing, said photo plug means being adapted to connect said master recorder to a local headphone set at each teaching unit location; assistance means provided in each of said conduit means at each teaching unit location, and sections manually operable to generate an alarm signal to request instructional aid.

4. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units at least one teaching unit having a coordinated visual, audio and teaching means contained therein positionable upon each of said working surface elemental units at least one teaching unit having coordinated visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; the teaching machine of said response unit including paper tape moving means controllable to move a paper tape in either a first direction or a second direction opposite said first direction; a question window, a correct answer window and a student answer window positioned relative to associated portions of said paper tape; a paper tape containing written educational material positioned to cooperate with said question window to present an interrogation to the user observable through said question window when said tape is in a first position and a writing surface accessible through said student's response window.

5. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units, at least one teaching unit having a coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; the teaching machine of said response unit including paper tape moving means controllable to move a paper tape in either a first direction or a second direction opposite said first direction; a question window, a correct answer window and a student answer window positioned relative to associated portions of said paper tape; a paper tape containing written educational material positioned to cooperate with said question window to present an interrogation to the user observable through said question window when said tape is in a first position and a writing surface accessible though said student's response window, said written educational material further including the correct answer to said interrogatiaon being positioned on said paper tape to be observable thorugh said correct answer window when said paper tape is advanced in a first direction from said first position; thwart means electrically connected to said paper tape moving means for signalling movement of said paper tape in said second direction.

6. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units, at least one teaching unit having a coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; the teaching machine of said response unit including paper tape moving means controllable to move a paper tape in either a first direction or a second direction opposite said first direction; a question window, a correct answer window and a student answer window positioned relative to associated portions of said paper tape; a paper tape containing written educational material positioned to cooperate with said question window to present an interrogation to the user observable through said question window when said tape is in a first position and a writing surface accessible through said student's response window, said written educational material further including the correct answer to said interrogation being positioned on said paper tape to be observable through said correct answer window when said paper tape is advanced in a first direction from said first position; thwart means electrically connected to said paper tape moving means for signalling movement of said paper tape in said second direction; said question window and said correct answer window each having a transparent member mounted therein; said question window transparent member being adapted to cover the paper tape portion positioned beneath said response window when said paper tape is advanced in said first direction.

7. A teaching aid system for use in providing educational instruction, comprising a console assembly having a main housing, said main housing having a telescoping supporting structure movable to a plurality of predetermined positions between a collapsed and a fully extended position; a working surface assembly positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units, at least one teaching unit having coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; the teaching machine of said response unit including paper tape moving means controllable to move a paper tape in either a first direction or a second direction opposite said first direction; a question window, a correct answer window and a student answer window positioned relative to associated portions of said paper tape; a paper tape containing written educational material positioned to cooperate with said question window to present an interrogation to the user observable through said question window when said tape is in a first position and a writing surface accessible through said student's response window; first and second spool members pivotally mounted in said teaching machine housing shubstantially parallel to one another; motor means; control means connected to said motor means movable to a first and a second position; said first and second positions controlling said motor to rotate in the clockwise and counterclockwise directions respectively; shaft means; gear means for rotating said shaft means under control of said motor means; said shaft means being adapted to rotate both said first and second spool means in a first or a second direction when said motor is rotating clockwise or counterclockwise respectively.

8. A teaching aid system for use in providing educational instruction, comprising a console assembly having a main housing, said main housing having a telescoping supporting structure movable to a plurality of predetermined positions between a collapsed and a fully extended position; a working surface elemental unit positioned upon said supporting structure; said working surface assembly including an adjustable number of elemental units successively arranged in juxtaposed position along the length of said support structure; the length of said support structure as determined by its selectable predetermined position defining the number of elemental units to be accommodated along said working surface elemental units at least one teaching unit having coordinated visual, audio and teaching means contained therein positionable upon each of said working surface elemental units for providing an educational format containing visual and audio material; said common conduit means operatively connectable to individual ones of said teaching units for transferring electrical power to said teaching units and program coordinating individual ones of said teaching units with said main housing; said teaching means providing means for enabling the user to participate both physically and mentally in the educational program; said supporting structure when in each of said predetermined positions compactly accommodating a selectible number of said working surface elemental units; said selectible number of working surface elemental units providing a desired number of teaching unit locations, each operatively connected to said console; said working surface elemental units including a flat substantially rectangular member positionable upon said supporting structure; conduit means positioned along the longitudinal axis of said flat member; said common conduit means having an individual section integral with each elemental unit, each common conduit section having a first end and a second end, said first end adapted to engage the second end of a preceding section, with the first end of the common conduit section closest to said housing engaging an outlet along the wall of said housing adjacent said supporting structure; the teaching machine of said response unit including paper tape moving means controllable to move a paper tape in either a first direction or a second direction opposite said first direction; a question window, a correct answer window and a student answer window positioned relative to associated portions of said paper tape; a paper tape containing written educational material positioned to cooperate with said question window to present an interrogation to the user observable through said question window when said tape is in a first position and a writing surface accessible though said student's response window; first and second spool members pivotally mounted in said teaching machine housing substantially parallel to one another; motor means; control means connected to said motor means movable to a first and a second position; said first and second positions controlling said motor to rotate in the clockwise and counterclockwise directions respectively; shaft means; gear means for rotating said shaft means under control of said motor means; said shaft means being adapted to rotate both said first and second spool means in a first or a second direction when said motor is rotating clockwise or counterclockwise respectively; thwart means connected to said paper tape feed control means for generating an alarm when said spool members are rotated in said second direction.

References Cited by the Examiner

UNITED STATES PATENTS

| | | | |
|---|---|---|---|
| 436,196 | 9/90 | Smith | 108—69 |
| 1,271,641 | 7/18 | Wermath | 35—60 X |
| 1,582,573 | 4/26 | Caldwell et al. | 35—60 |
| 2,169,266 | 8/39 | Matter | 35—9 |
| 2,334,776 | 11/43 | King et al. | 35—60 |
| 2,431,784 | 12/47 | White | 35—34.4 XR |
| 2,798,172 | 7/57 | Jones | 35—35.3 XR |
| 2,987,828 | 6/61 | Skinner | 35—9 |

OTHER REFERENCES

Pages 76–81, February 1961, "Electrifying the Three R's" from Pageant Magazine.

JEROME SCHNALL, *Primary Examiner.*

L. SMILOW, GEORGE NINAS, JR., *Examiners.*